(12) United States Patent
Davis et al.

(10) Patent No.: US 6,482,347 B1
(45) Date of Patent: Nov. 19, 2002

(54) METHOD OF MAKING A LARGE-DIAMETER BLOW-MOLDED CONTAINER HAVING A NARROW MOUTH

(75) Inventors: Samuel B. Davis, New Albany, OH (US); James A. Thibodeau, Gahanna, OH (US)

(73) Assignee: Liqui-Box Corporation, Worthington, OH (US)

( * ) Notice: Subject to any disclaimer, the term of this patent is extended or adjusted under 35 U.S.C. 154(b) by 0 days.

(21) Appl. No.: 09/547,329

(22) Filed: Apr. 11, 2000

Related U.S. Application Data

(60) Provisional application No. 60/129,367, filed on Apr. 15, 1999.

(51) Int. Cl.[7] .............................. B29C 49/22; B32B 1/08
(52) U.S. Cl. ...................... 264/512; 264/513; 264/523; 264/537; 264/250; 428/35.7; 428/542.8
(58) Field of Search .............................. 264/512, 513, 264/523, 537, 250; 428/35.7, 542.8

(56) References Cited

U.S. PATENT DOCUMENTS

| | | | | |
|---|---|---|---|---|
| 4,293,520 A | * | 10/1981 | Akutsu | 264/138 |
| 4,507,258 A | * | 3/1985 | Aoki | 264/247 |
| 5,762,970 A | * | 6/1998 | Takashima et al. | 264/537 |
| 6,217,818 B1 | * | 4/2001 | Collette et al. | 264/255 |

* cited by examiner

Primary Examiner—Suzanne E. McDowell

(57) ABSTRACT

A preform or parison for manufacturing a container having a large interior diameter body and small interior diameter opening is prepared by molding the preform in two parts, a body having a generally cylindrical sidewall with one open end and one closed end, and a preform end having a diameter sized to mate with the sidewall and an opening therein for accessing the interior of the preform, and then joining the preform body and preform end to form a complete preform having an internal diameter larger than the diameter of the opening. The preform so formed is then used in a conventional blow molding process to produce a container having a large internal diameter and a narrow access opening.

6 Claims, 3 Drawing Sheets

METHOD OF MAKING A LARGE-DIAMETER BLOW-MOLDED CONTAINER HAVING A NARROW MOUTH

This application claims the benefit of U.S. Provisional Application No. 60/129,367 filling date Apr. 15, 1999.

BACKGROUND OF THE INVENTION

1. Field of the Invention

This invention relates to a method of making a hollow, stretch blown plastic container, and to the resulting product, such as a bottle, with a relatively large size as compared to the size of the opening in the container.

2. Brief Description of the Prior Art

Plastic containers, that is, containers constructed primarily of substituted or unsubstituted hydrocarbons have, for some time, been in prevalent use. Increased popularity, as compared with inorganic glass, the increased popularity of such plastic containers is due to a variety of factors in particular improved impact resistance, reduced weight, and, perhaps most significantly, reduced cost.

As would be expected, procedures for producing so popular a commodity have been in continuing transition. What started as a simple operation, analogous to that used for inorganic glass has evolved through a variety of stages. Today, most containers are produced by procedures which involve the initial formation of a preform, sometimes denoted a parison, followed by expansion of the preform to produce the final containers. Preforms are commonly produced by any of the various molding operations with extrusion and injection being predominant methods. The term "preform" generally indicates a solid article produced by injection molding, extrusion, or the like, which is removed from the mold in which it is formed and subsequently transferred to a blow mold where it is expanded to a final shape. The term "parison" is sometimes used for such objects, although it more properly refers to an extruded mass of plastic that is immediately blow molded without undergoing an intermediate solidification. In this application, the term "preform" is used to denote a solid molded intermediate article which is subsequently heated and expanded in a blow mold to form a final shaped article, and is intended to include the term "parison" if that term is used to denote such an intermediate article. Expansion of the preform is commonly carried out by means of internal gas pressure with the final form of the container being determined by a mold specifically designed for this operation.

A most sophisticated form of blow molding is now commercially significant. It differs from earlier procedures in that the preform is first stretched and then blown while its temperature is much lower than with conventional processes—generally, within the 100° F. range above Tc; (the temperature at which the plastic material passes from the glass phase to the rubber phase). This procedure, which is known as stretchblow molding, or orientation blow molding, is not only replacing more conventional procedures, but has opened new markets. Advantages of the procedures are all related to biaxial orientation of the polymer material. Regardless of how the preform is initially formed, e.g., whether by extrusion or injection, and regardless of whether the procedure is two-stage or in-line, the preform, while at a temperature insufficient to permit free plastic flow is expanded biaxially to conform with the blow mold. The temperature of operation, generally within the 100° F. range immediately above Tc, is such that the expansion introduces true strain into the material. When translated into a definable polymer orientation the strain results in a number of positive attributes. Alignment of the polymeric molecules results in increased tensile strength, as well as increased-clarity,increased impact strength, and reduced creep.

A vast market for carbonated soft drink containers is a direct result of significantly improved gas barrier properties Suitable container materials are substituted and unsubstituted thermoplastic hydrocarbons. Commonly used materials at this time include polyethylene terephthalate, and polypropylene. The procedures described above are well known and included in standard reference texts. See, for example, Modern Plastics Encyclopedia, Vol. 54, No. 10A, 1977–1978, McGraw-Hill Publishing Co. (e.g., sections on "Blow Molding" at page 230 et seq.; "Injection-Blow Molding" at page 232 et seq.; and "Stretch-blow Molding" at page 233 et seq.).

It is well known that the various types of stretch-blow molding procedures have not been successful in producing containers with a large size relative to the size of the opening in the container. Yet there is a commercial demand for clear containers with such a large size relative to the size of the opening in the container, especially when used to contain water, juice, and other non-carbonated beverages. The small opening size is desirable so that relatively small size closures or dispensing valves can be used.

The problem with producing large size containers relative to the size of the opening in the container is that the extent to which the plastic can be stretched to increase the interior diameter of the preform to the interior size of the container has a practical limit. The interior diameter of the preform (see FIG. 1) is limited to the diameter of the opening in the container.

A preform with a larger interior diameter in the body than in the opening (such as illustrated in FIG. 2) would allow manufacture of relatively large containers with a small opening. However, a preform such as shown in FIG. 2 cannot be injection molded (as most preforms are for the stretch blow process) since a mold core with a diameter large enough to form the inside diameter of the preform body cannot be removed through the small opening.

Accordingly a need has continued to exist for a method of manufacturing a large-diameter blow-molded plastic container having a relatively narrow mouth.

SUMMARY OF THE INVENTION

The present invention is directed to a method for producing a preform with a large interior diameter body and small interior diameter opening (as shown in FIG. 2 of the drawings.) To accomplish this result the preform is injection molded in two parts (as in FIG. 3) so that the core can be removed from the interior of the large body of the preform.

The two parts are then joined together (as shown in FIG. 4) using any conventional method including, for example, spin welding, hot plate welding, ultrasonic welding, solvent welding, cementing, laser welding, mechanical joining, or the like. The joined preform is then used to stretch blow a container that is larger than current methods can produce with the same opening (see FIG. 5 for example.)

DETAILED DESCRIPTION OF THE INVENTION AND PREFERRED EMBODIMENTS

The invention will be described by reference to the drawings, which show a preferred embodiment of the invention.

Figures 1, 2:
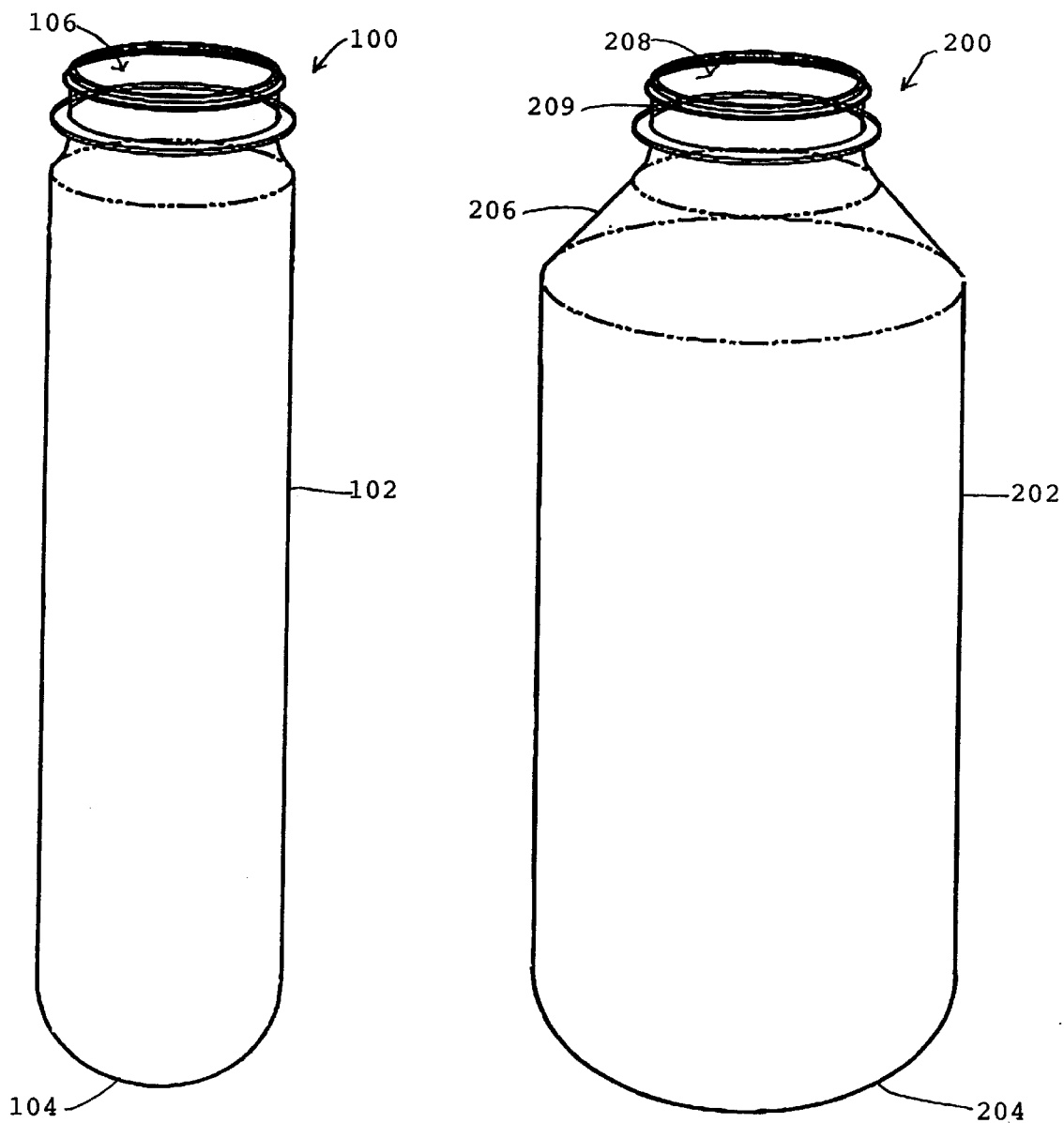
FIG. 1 illustrates a one-piece molded preform of the prior art.
FIG. 2 illustrates a preform as constructed according to the method of this invention.

FIG. 1 illustrates a conventional preform 100 of the type used in conventional blow molding processes. The preform 100 has a wall 102, a closed end 104 and an open or mouth 106. The inner diameter of the wall 102 is approximately the same as the diameter of the opening 106. This construction represents the structure of prior art preforms prepared by injection molding. In such preforms, the mouth must be wide enough to accommodate removal of the core of the mold.

In blow molding of containers from parisons or preforms, the amount of stretching is limited by the properties of the plastic. Accordingly, the finished container can have a diameter only a certain percentage greater than the diameter of the preform. Therefore, the narrow preform 100 of the prior art can only yield a relatively narrow container. Typically such containers have a diameter only somewhat greater than the diameter of the mouth of the container.

This invention produces a blow-molded container having a large-diameter body with a relatively narrow mouth, by starting with a preform 200 such as that illustrated in FIG. 2. Such a preform 200, has a wall 202 having a closed end 204 and an open end 206 provided with an opening or mouth 208. The wall 202 has a diameter somewhat greater than that of the mouth 206. Consequently, the wall 202 can be expanded in the blow molding process to a larger diameter than is possible with a conventional preform 100 of the type illustrated in FIG. 1.

In order to prepare a preform 200 according to the invention a separate end piece 210 is molded by any conventional molding method, e.g., compression molding, injection molding, thermoforming or the like. The end piece 210 has a peripheral rim 212 shaped to fit the cross-sectional shape of the preform 200 (typically circular, as shown) and is provided with an opening 208 usually at the end of a neck 209. The mouth 208 is generally molded to have a diameter generally of the size desired in the finished container.

A preform body 214 is also formed by any conventional molding procedure, e.g., injection molding, extrusion, or the like. The body 214 has a wall 202, a closed end 204 and an open end 216 having a rim 218 sized to mate with the rim 212 of the end piece 210. The thickness of the wall and closed end will be such as to provide a container wall of appropriate thickness after the preform is expanded in a blow-molding step.

Figures 3, 4:
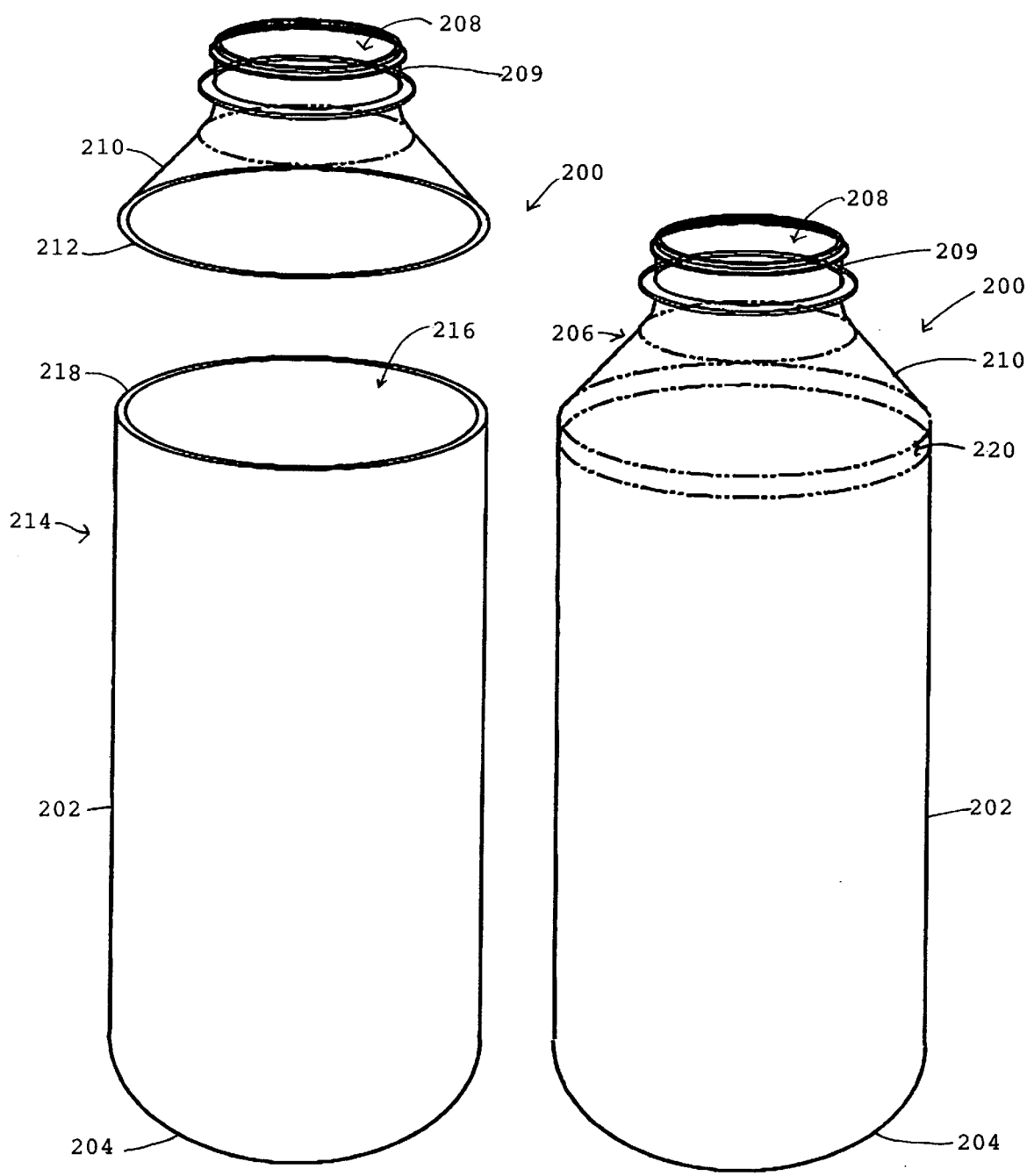
FIG. 3 illustrates the two elements of the preform before they are joined together to form the preform used in the method of this invention.
FIG. 4 illustrates the preform of the invention having a welded joint between the mouth section and the body section.

The preform end and preform body are then joined by any conventional means to form a complete preform having a relatively large body diameter and a relatively narrow opening or mouth, as shown in FIG. 4. Accordingly, the preform body and preform end can be joined by, spin welding, hot plate welding, ultrasonic welding, solvent welding, cementing, laser welding, mechanical joining, or any other conventional method. The assembled and joined preform is then used to stretch blow a container that is larger than current methods can produce with the same opening (see FIG. 5 for example.)

Finally, the complete preform is placed in a conventional blow mold having the dimensions and configuration of the desired container and expanded at an appropriate temperature to form a container having a large diameter and a narrow mouth.

Figure 5:
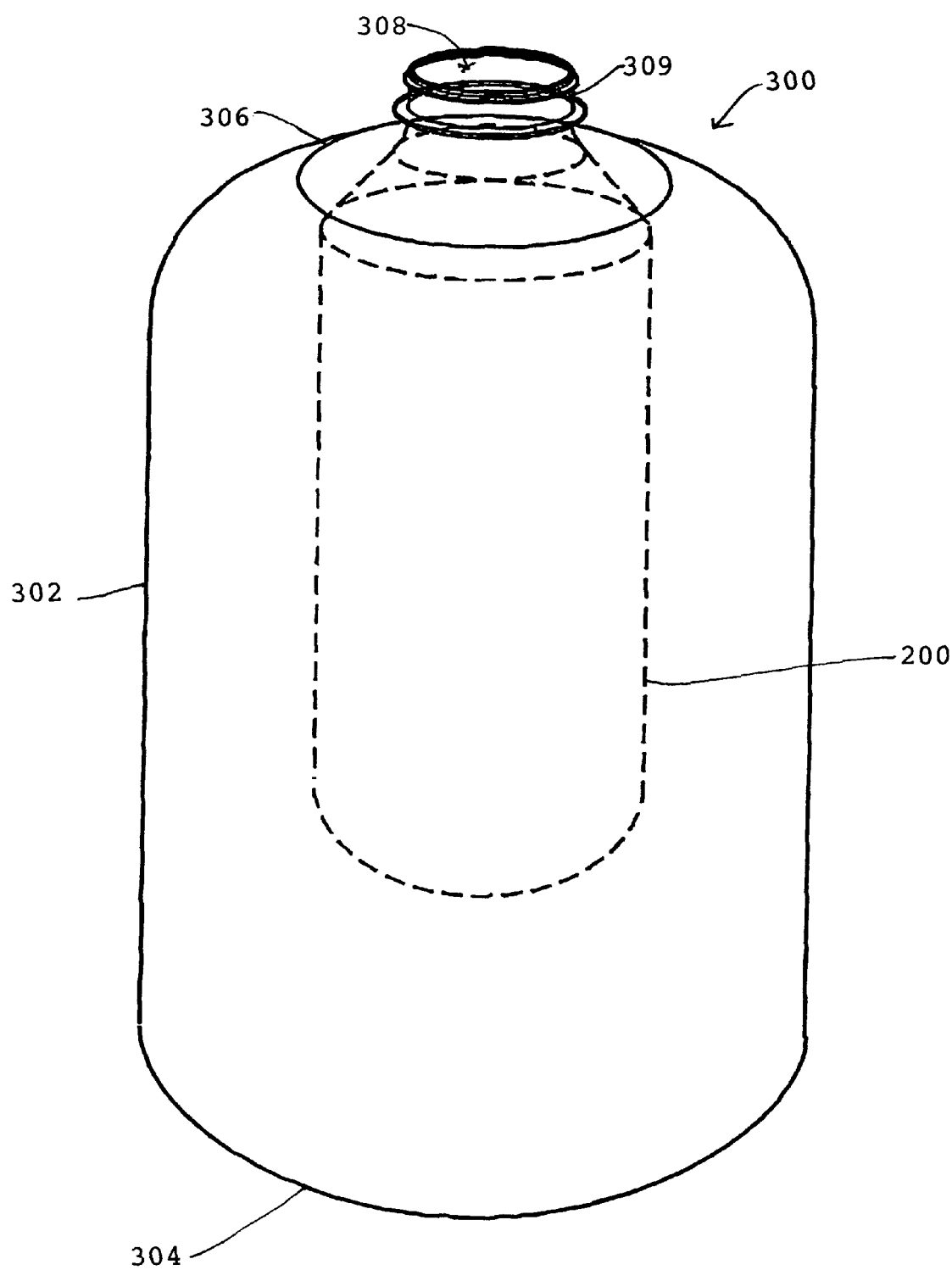
FIG. 5 illustrates a wide-body narrow-mouth container prepared by the method of the invention.

A finished container 300 prepared by the method of the invention is illustrated in FIG. 5. The finished container 300 has a wall 302, a closed bottom 304 and an open end 306 provided with an opening or mouth 308 on a neck 309. The preform 200 from which the container 300 is blow molded is shown in phantom in order to illustrate the increase in diameter obtainable by the process of the invention. The finished diameter of the container 300 is substantially greater than the diameter of the mouth 308. Consequently, a container 300 prepared by the process of the invention has a mouth that is relatively narrow for the size of the container, and has the advantage that relatively small closures and/or dispensing valves can be used.

The method of the invention is applicable to the manufacture of large containers from any conventional plastic material used for such containers. For example, containers of polyethylene, polypropylene, polyethylene terephthalate, polycarbonate and the like may be formed by the method of the invention.

The invention having now been fully described, it should be understood that it may be embodied in other specific forms or variations without departing from its spirit or essential characteristics. Accordingly, the embodiments described above are to be considered in all respects as illustrative and not restrictive, the scope of the invention being indicated by the appended claims rather than the foregoing description, and all changes which come within the meaning and range of equivalency of the claims are intended to be embraced therein.

We claim:

1. A method for producing a blow molded plastic container comprising providing a molded plastic preform end having an opening therein providing a molded preform body having a circumferential side wall, a closed end and an open end, joining said preform end to said open end of said preform body, and expanding said preform body by blow-molding to form a container.

2. The method of claim 1 wherein said preform body has a generally cylindrical shape.

3. The method of claim 1 wherein said preform is made from polyethylene.

4. The method of claim 1 wherein said preform is made from polypropylene.

5. The method of claim 1 wherein said preform is made from poly(ethylene terephthalate).

6. The method of claim 1 wherein said preform is made from polycarbonate.

* * * * *